(12) United States Patent
Motzet et al.

(10) Patent No.: US 7,005,114 B2
(45) Date of Patent: Feb. 28, 2006

(54) GAS GENERATION SYSTEM FOR A REFORMER AND METHOD FOR PROVIDING A GAS FLOW TO A REFORMER

(75) Inventors: Bruno Motzet, Weilhelm/Teck (DE); Alois Tischler, Dorfen (DE)

(73) Assignee: NuCellSys GmbH, Kirchheim/Teck-Nabern (DE)

( * ) Notice: Subject to any disclaimer, the term of this patent is extended or adjusted under 35 U.S.C. 154(b) by 415 days.

(21) Appl. No.: 09/988,388

(22) Filed: Nov. 19, 2001

(65) Prior Publication Data

US 2002/0085966 A1 Jul. 4, 2002

(30) Foreign Application Priority Data

Nov. 17, 2000 (DE) ............... 100 57 018

(51) Int. Cl.
*B01J 8/00* (2006.01)
*F28D 1/00* (2006.01)
*G05D 23/00* (2006.01)

(52) U.S. Cl. .................. 422/198; 422/204; 422/109

(58) Field of Classification Search ............ 48/87, 48/94, 95, 211, 214 R, 215, 214 A; 422/105, 422/107–111, 198, 204, 211

See application file for complete search history.

(56) References Cited

U.S. PATENT DOCUMENTS

| | | | | |
|---|---|---|---|---|
| 4,946,667 A | * | 8/1990 | Beshty | 423/648.1 |
| 4,976,747 A | | 12/1990 | Szydlowski et al. | 48/127.9 |
| 4,994,331 A | | 2/1991 | Cohen | 429/17 |
| 5,344,721 A | | 9/1994 | Sonai et al. | 429/20 |
| 5,928,614 A | | 7/1999 | Autenrieth et al. | 422/211 |
| 6,264,856 B1 | * | 7/2001 | Autenrieth et al. | 252/373 |
| 6,447,736 B1 | | 9/2002 | Autenrieth et al. | |
| 6,730,271 B1 | * | 5/2004 | Hirata | 422/110 |
| 2002/0031450 A1 | * | 3/2002 | Yamashita et al. | 422/105 |

FOREIGN PATENT DOCUMENTS

| | | |
|---|---|---|
| DE | 196 24 435 | 6/1996 |
| DE | 197 13 242 | 3/1997 |
| DE | 19624433 C1 | 12/1997 |
| EP | 0 861 802 | 2/1998 |
| EP | 0 861 802 A2 * | 9/1998 |
| EP | 0 921 584 | 6/1999 |
| JP | 2-120204 | 5/1990 |
| JP | 2-263701 | 10/1990 |
| JP | 3-199102 * | 8/1991 |
| JP | 3-199103 * | 8/1991 |
| JP | 4-187502 * | 7/1992 |

OTHER PUBLICATIONS

European Search Report dated Mar. 23, 2004.

* cited by examiner

Primary Examiner—Kevin P. Kerns
(74) Attorney, Agent, or Firm—Crowell & Moring LLP

(57) ABSTRACT

A gas generation system for providing a gas flow to be supplied to a reformer includes an evaporator for evaporating the components contained in a gas flow, wherein the gas flow includes at least one carbon compound, such as hydrocarbon or alcohol, and water vapor. A normalizing stage is connected between the evaporator and the reformer for equalizing the temperature distribution in the gas flow to be supplied to the reformer. The temperature of the gas flow should be equalized to a temperature range below the maximum allowable reformer inlet temperature. In this way, temperature maxima caused by a load change are equalized, thereby significantly increasing the service life of the reformer catalyst.

16 Claims, 2 Drawing Sheets

GAS GENERATION SYSTEM FOR A REFORMER AND METHOD FOR PROVIDING A GAS FLOW TO A REFORMER

This application claims the priority of German patent document 100 57 018.6, filed Nov. 17, 2000, the disclosure of which is expressly incorporated by reference herein.

BACKGROUND AND SUMMARY OF THE INVENTION

The present invention relates to a gas generation system for providing a gas flow to be supplied to a reformer, with the gas flow comprising at least one carbon compound, such as hydrocarbon or alcohol, and water vapor. An evaporator for evaporating at least one of the components supplied to the reformer is provided. The present invention also relates to a corresponding method for providing a gas flow to a reformer.

Gas generation systems of this type are used, for example, to supply hydrogen as a fuel to fuel cell systems. Hydrocarbons or alcohols, such as methanol, together with water vapor are supplied to the reformer in gaseous form, where a catalytic conversion to a reformate is performed. The reformate contains essentially hydrogen, carbon dioxide, water (vapor) and carbon monoxide. The hydrogen contained in the reformate is used as fuel for operating the fuel cell system. Such fuel cell systems are used, for example, for powering electric motors in motor vehicles.

U.S. Pat. No. 5,344,721 discloses a gas generation system for a steam reformer with a connected fuel cell system. The system evaporates the components to be supplied to the reformer in several steps. Water is initially preheated in the cooling loop of the fuel cell, then partially evaporated through heat exchange with the hot reformate exiting the reformer, and subsequently completely evaporated through heat exchange with a burner that heats the reformer. A heat exchange with the cooling loop of the fuel cell is sufficient to evaporate the required alcohols.

Likewise, U.S. Pat. No. 4,994,331 discloses evaporation of fuel and water through heat exchange with the fuel cell coolant and the reformate flow.

U.S. Pat. No. 4,976,747 discloses the evaporation of fuel through heat exchange with reacted hot fuel cell exhaust gas.

The above methods for evaporating the components to be supplied to the reformer do not address effects caused by load changes. The service life of reformer catalysts depends, among other things, on the inlet conditions of the components (educts). Inlet conditions that are not constant and instead vary over a wide temperature range during a load change significantly reduce the service life of the reformer catalysts.

Moreover, components, such as gas cleaning (shift and selective oxidation stages) have to be designed for the worst possible operating conditions, which increases the overall dimensions and weight as well as manufacturing costs. During load changes, the vapor state (vapor temperature) can vary considerably due to the time delay between the components to be evaporated and the required and available heat content of the heating means. It has been observed that variations in the steam temperature significantly reduce the expected service life of the reformer catalysts.

It is therefore an object of the present invention to provide an improved gas generation system and a method for producing a gas flow to be supplied to a reformer, which effectively counteracts the decrease in the expected service life of the reformer catalysts caused by load variations.

This object is addressed by a gas generation system and by a method according to preferred embodiments of the present invention.

According to the present invention, a normalizing stage is connected between the evaporator and the reformer for equalizing the temperature distribution in the gas flow to be supplied to the reformer. The normalizing stage equalizes the temporal temperature valleys and peaks. According to the present invention, the temperature of the gas flow is equalized to within a temperature range that is lower than the maximal allowable reformer inlet temperature. This guarantees that large temperature variations of the evaporated components are equalized before these components enter the reformer, even in the event of a load change.

Advantageously, the normalizing stage of the present invention can be connected to conventional evaporators with several evaporator stages after the last evaporator stage and before the reformer. Optionally, additional normalizing stages can be connected between the evaporator stages.

The temperature profile of the gas flow supplied to the reformer can be equalized in different ways. For example, the normalization stage can be implemented as an adiabatic stage in which fuel and air are reacted adiabatically by a catalyst. The exothermic reaction heats the adiabatic stage. The temperature of the gas flow leaving the adiabatic stage has to be below the maximum permissible inlet temperature of the reformer. For this purpose, the air flow to the adiabatic stage is controllably metered as a function of the temperature. Additional fuel can be supplied externally to replace the spent fuel. Metering the fuel supplied to the gas flow to be reformed obviates the need for additional fuel metering in the catalytic burner of the secondary side, thereby reducing emissions.

In addition, the normalization stage can have the form of a simple heat exchanger that brings the mixture to be supplied to the reformer to a temperature below the maximum allowable inlet temperature of the reformer. Fuel cell exhaust gas or hot reformate can be supplied to a secondary side (heat source) of the heat exchanger. It will be understood that other heat sources can also be employed.

Alternatively, the normalization stage of the present invention can be in the form of a catalytically heated reactor which has (1) a primary side through which gas flows to the reformer, and (2) a secondary side that is used to heat the gas flow. A burnable gas is catalytically reacted with air in the secondary side of the catalytic reactor, wherein like the above-described adiabatic stage, the burnable gas/air can be controllably metered as a function of the temperature. For this purpose, a temperature sensor is provided in the outlet line of the primary side of the catalytic reactor. The temperature sensor is connected with a control unit that controls a valve supplying the burnable gas/air mixture. The burnable gas can be the gas to be reformed or hydrogen, and derived, for example, from the fuel cell exhaust gas.

The present invention increases the service life of the reformer catalysts. At the same time, the dynamics of the reformer process can be enhanced without lowering the life expectancy of the reformer catalysts. This allows a more dynamic operation with longer maintenance intervals.

Other objects, advantages and novel features of the present invention will become apparent from the following detailed description of the present invention when considered in conjunction with the accompanying drawings.

DETAILED DESCRIPTION OF THE DRAWINGS

Figure 1:
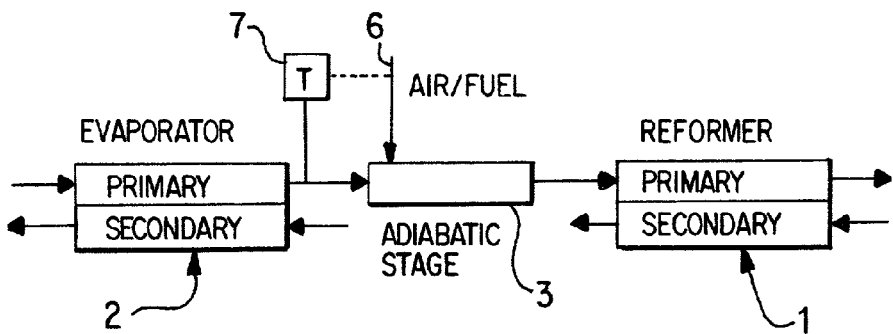
FIG. 1 shows in a simplified schematic form a gas generation system according to the present invention with an adiabatic stage connected between an evaporator and a reformer.

The gas generation system of FIG. 1 includes a reformer 1 that produces a hydrocarbon-containing reformate by reforming a hydrocarbon compound, in this example methanol, in a manner known in the art. The gas flow to be reformed, which in addition to methanol also contains water, is supplied to a primary side of the reformer. The reformer is heated via its secondary side for maintaining the required catalyst temperature. The reformer can be heated with the help of a catalytic burner which exothermically converts hydrogen contained in the fuel cell exhaust gas. The burner can also be operated with methanol or with another fuel.

The components to be supplied to the reformer (in the present example methanol and water) are evaporated in the primary side of the evaporator 2. The components can be mixed, for example, in a predetermined mixing ratio and subsequently supplied to the evaporator 2. Alternatively, the evaporation step can be performed in several stages, wherein a different number of evaporator stages can be provided for different components having different boiling points. Preferably, the normalizing stage in this case is the adiabatic stage 3 connected after the last evaporator stage.

Air is supplied to the adiabatic stage 3 via a supply line 6 wherein the fuel catalytically reacts with oxygen derived from air. The heat released from this reaction causes an increase in the temperature of the adiabatic stage and thereby also in the temperature of the gas flowing through the adiabatic stage. For example, methanol can be used as fuel, so that the fuel reacted in the adiabatic stage can advantageously be replaced with methanol. It will be understood by those skilled in the art that the adiabatic stage can also be operated with a different fuel.

Connecting the adiabatic stage 3 between the evaporator 2 and the reformer 1, as disclosed in the present invention, equalizes the temporal temperature variations of the gas flow to be supplied to the reformer. Care has to be taken not exceed the maximum allowable inlet temperature of the reformer 1. Accordingly, a temperature-dependent control of the air and/or fuel quantity supplied via the line 6 can advantageously be incorporated.

For this purpose, a temperature sensor 7 is provided which measures the temperature on the inlet side of the adiabatic stage and provides a corresponding signal to a control unit (not shown) that regulates the quantity of air and/or fuel supplied as a function of the measured temperature. Alternatively, the temperature sensor 7 can also be connected to the outlet side of the adiabatic stage 3 to determine how much air and/or fuel has to be supplied to the adiabatic stage 3 for achieving a predetermined outlet temperature.

Since the adiabatic stage 3 reacts quickly to changes in the air and/or fuel supply, the system can be used to dynamically adapt to temperature variations in the gas flow exiting the evaporator 2 and hence also to dynamically equalize the temperature before the reformer 1.

Figure 2:
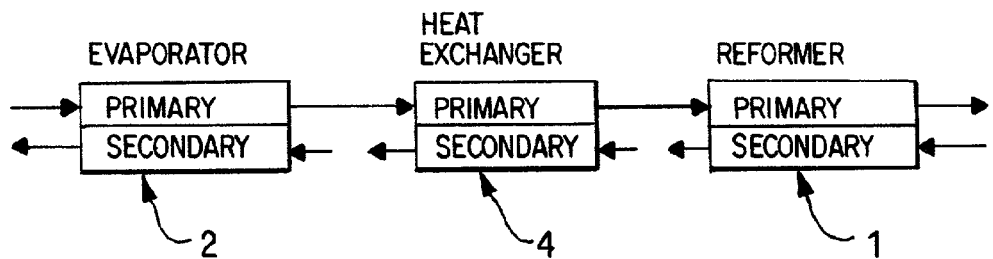
FIG. 2 shows an embodiment of a gas generation system according to the present invention with a heat exchanger connected between an evaporator and a reformer.

FIG. 2 shows another embodiment of the normalizing stage of the present invention, wherein in this embodiment the normalizing stage is in form of a heat exchanger 4. The other components of the gas generation system are identical to those of FIG. 1 and will therefore not be discussed further. The gas exiting the evaporator 2 enters a primary side of the heat exchanger 4 where the temperature variations are equalized. For this purpose, heat is supplied via a secondary side of the heat exchanger, so that the gas mixture exiting from the primary side attains the desired temperature below the maximum allowable inlet temperature of the reformer 1. Typically, the gas flow is additionally heated in the heat exchanger 4. A situation may also arise where the gas mixture exiting the evaporator 2 has to be cooled so as not to exceed the maximum allowable inlet temperature of the reformer.

For heating the gas flow, the secondary side of the heat exchanger 4 can be supplied, for example, with hot exhaust gas from a catalytic burner that catalytically converts hydrogen from the exhaust gas of the fuel cell system. Alternatively, the secondary side of the heat exchanger 4 can also be supplied with hot reformate exiting the reformer 1. Of course, the secondary side of the heat exchanger 4 can also be supplied from other heat sources. A suitable selection may depend on the material flow rate as well as the existing and desired temperatures.

The heat exchanger 4 represents a relatively simple system of a normalizing stage and dampens the temperature excursions of the gas flow to be supplied to the reformer 1.

Figure 3:
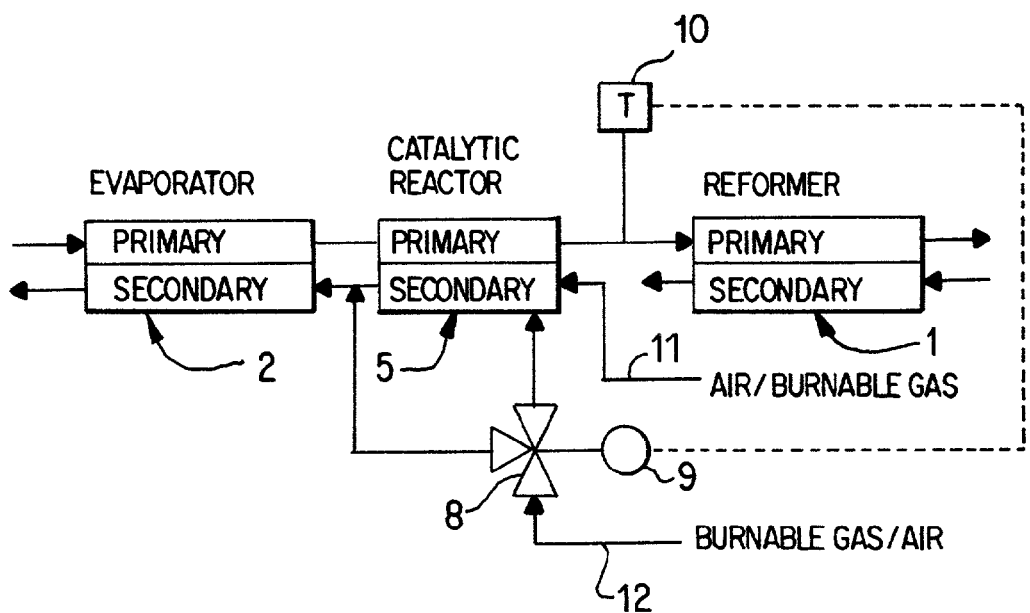
FIG. 3 shows another gas generation system according to the present invention with a catalytically heated reactor connected between an evaporator and a reformer.

FIG. 3 shows another embodiment of the normalizing stage of the present invention, which in this case has the form of a catalytically heated reactor 5. The other components of the gas generation system again correspond to those of FIGS. 1 and 2.

The catalytically heated reactor 5 includes a secondary side in which fuel is reacted catalytically with air. The generated heat is transferred to the primary side. The evaporated components flow through the primary side of the catalytically heated reactor 5 and are subsequently introduced into the reformer 1. Advantageously, the quantity of the supplied air and/or fuel is regulated depending on the temperature of the gas flow to be supplied to the reformer 1, as illustrated in FIG. 3. For this purpose, a temperature sensor 10 is provided which is connected to a control unit 9 and supplies to the control unit a signal corresponding to the measured temperature. Aside from the quantity of burnable gas/air to be supplied by way of a control valve 8 to the secondary side of the catalytically heated reactor 5, a controlled quantity of burnable gas/air can also be supplied by way of the control valve 8 to the secondary side of the evaporator 2. For example, air (or burnable gas) can advantageously be introduced into the secondary side via an additional line 11, while burnable gas (or air) can be introduced via the line 12. The quantity of burnable gas (or air) can be regulated as a function of the temperature and supplied to the respective secondary side of the catalytic reactor 5 and/or evaporator 2. This arrangement provides optimal control of the quantity of the components (air and burnable gas) reacted in the evaporator 2 and catalytic reactor 5 as well as of the heat produced therein. In particular, the line 11 can be supplied with cathode exhaust gas and the line 12 with anode exhaust gas (or vice versa) of a connected fuel cell system.

The additional cost associated with the control devices required for this embodiment can be justified in view of the enhanced dynamics of the system (for large load variations).

The present invention equalizes the temperature variations of the gas flow to be supplied to the reformer 1, thereby significantly increasing the service life of the reformer catalysts. At the same time, the invention provides that the temperature of the gas mixture to be supplied to the reformer can be adjusted to slightly less than the maximum allowable inlet temperature of the reformer.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A gas generation system for providing a gas flow, comprising:
    a reformer;
    an evaporator for evaporating at least one component to be supplied to the reformer, thereby producing a gas flow comprising at least one carbon compound and water vapor; and
    a normalizing stage connected between the evaporator and the reformer including a primary side where temperature valleys and peaks of the gas flow are equalized to within a temperature range below a maximal allowable reformer inlet temperature and a secondary side via which heat is supplied to the primary side.

2. A gas generation system according to claim 1, wherein the at least one carbon compound is a hydrocarbon or alcohol.

3. A gas generation system according to claim 1, wherein the evaporator comprises several evaporation stages and wherein the normalizing stage is connected after the last evaporation stage.

4. A gas generation system for providing a gas flow, comprising:
    a reformer;
    an evaporator for evaporating at least one component to be supplied to the reformer, thereby producing a gas flow comprising at least one carbon compound and water vapor; and
    a normalizing stage connected between the evaporator and the reformer by which temperature valleys and peaks of the gas flow are equalized to within a temperature range below a maximal allowable reformer inlet temperature,
    wherein the normalizing stage is an adiabatic stage.

5. A gas generation system according to claim 4, further comprising a temperature sensor disposed at an inlet or an outlet of the adiabatic stage for regulating a quantity of at least one of air and fuel to be supplied to the adiabatic stage.

6. A gas generation system according to claim 1, wherein the normalizing stage is a heat exchanger.

7. A gas generation system according to claim 1, wherein the normalizing stage is a catalytically heated reactor.

8. A gas generation system according to claim 7, further comprising a temperature sensor for regulating a quantity of at least one of air or fuel to be supplied to the catalytically heated reactor, wherein the temperature sensor cooperates with a control unit that controls a control valve located in at least one of a supply line for air and for fuel, and wherein the temperature sensor can be disposed on an inlet side of a gas flow or an outlet side of the gas flow of the catalytically heated reactor.

9. A method for providing a gas flow to be supplied to a reformer, comprising:
    evaporating, with an evaporator, at least one component, thereby producing a gas flow containing at least one carbon compound and water vapor;
    equalizing, with a primary side of a normalizing stage connected between the evaporator and the reformer, temperature valleys and peaks of the gas flow to be supplied to the reformer to within a temperature range below a maximal allowable reformer inlet temperature before the gas flow is introduced into the reformer; and
    supplying heat to the primary side via a secondary side of the normalizing stage.

10. A method according to claim 9, wherein the at least one carbon compound is a hydrocarbon or alcohol.

11. A method according to claim 9, wherein for multistage evaporating, the temperature of the gas flow is equalized after a last evaporation stage.

12. A method for providing a gas flow to be supplied to a reformer, comprising:
    evaporating at least one component, thereby producing a gas flow containing at least one carbon compound and water vapor; and
    equalizing temperature valleys and peaks of the gas flow to be supplied to the reformer to within a temperature range below a maximal allowable reformer inlet temperature before the gas flow is introduced into the reformer;
    wherein said equalizing of a temperature of the gas flow is by an adiabatic stage.

13. A method according to claim 12, further comprising regulating a quantity of at least one of air or fuel supplied to the adiabatic stage as a function of a temperature of the gas flow.

14. A method according to claim 9, wherein said equalizing of a temperature of the gas flow is by a heat exchanger.

15. A method according to claim 9, wherein said equalizing of a temperature of the gas flow is by a catalytically heated reactor.

16. A method according to claim 14, further comprising regulating a quantity of at least one of air or fuel supplied to the catalytically heated reactor as a function of the temperature of the gas flow.

* * * * *